United States Patent
Vasa et al.

(10) Patent No.: US 7,817,587 B2
(45) Date of Patent: Oct. 19, 2010

(54) PERSONAL INFORMATION MANAGEMENT USING CONTENT WITH EMBEDDED PERSONAL INFORMATION MANAGER DATA

(75) Inventors: Yojak H. Vasa, Cary, NC (US); L. Scott Bloebaum, Cary, NC (US)

(73) Assignee: Sony Ericsson Mobile Communications, AB, Lund (SE)

( * ) Notice: Subject to any disclaimer, the term of this patent is extended or adjusted under 35 U.S.C. 154(b) by 919 days.

(21) Appl. No.: 11/315,412

(22) Filed: Dec. 22, 2005

(65) Prior Publication Data

US 2007/0147274 A1     Jun. 28, 2007

(51) Int. Cl.
    *G06F 15/16*     (2006.01)

(52) U.S. Cl. .......................................... 370/310; 725/25

(58) Field of Classification Search ................. 370/310; 340/825.5, 825.51; 725/25, 29
See application file for complete search history.

(56) References Cited

U.S. PATENT DOCUMENTS

| 7,295,252 | B2 * | 11/2007 | Watanabe et al. | 348/734 |
| 2005/0131677 | A1 * | 6/2005 | Assadollahi | 704/201 |
| 2006/0248209 | A1 * | 11/2006 | Chiu et al. | 709/231 |
| 2006/0265637 | A1 * | 11/2006 | Marriott et al. | 715/500.1 |

* cited by examiner

*Primary Examiner*—Sam Bhattacharya
(74) *Attorney, Agent, or Firm*—Myers Bigel Sibley & Sajovec, P.A.

(57) ABSTRACT

Some embodiments of the present invention provide methods of operating an electronic device, such as a wireless communications terminal, a personal digital assistant and/or a media player, having a personal information manager, such as a scheduling application and/or a contact management application. Data is received at the electronic device, the received data including audio and/or visual content and associated personal information manager data. The personal information manager is controlled responsive to the personal information manager data.

17 Claims, 6 Drawing Sheets

PERSONAL INFORMATION MANAGEMENT USING CONTENT WITH EMBEDDED PERSONAL INFORMATION MANAGER DATA

BACKGROUND OF THE INVENTION

The present invention relates to electronic devices and, more particularly, to managing personal information, such as event and/or contact information, for electronic devices.

Mobile terminals are typically purchased by a user to obtain access to wireless phone services through a cellular network telecommunications provider. However, capabilities of mobile terminals have multiplied to the point where they can perform functions previously found only in, for example, personal computers and personal digital assistants. Such functions include web browser applications, email applications, and other personal information manager (PIM) applications, such as appointment calendars, task managers, contact managers (e.g., for telephone numbers and e-mail addresses) and the like.

Mobile terminals with multimedia capabilities are also now available. For example, a mobile terminal may be provided with a radio tuner capability so as to receive amplitude modulation (AM) and/or frequency modulation (FM) broadcast radio channels by tuning to the station identifier for the radio station of a particular broadcast media source. Some mobile terminals also have the capability to play digital audio and/or video files, such as MP3 files and "podcasts," which may be downloaded from internet websites or from storage media.

Podcasting is a technique for publishing content, typically audio programs, via the Internet. Podcasting typically uses a "feed," such as an XML RSS (e.g., Really Simple Syndication) or Atom formatted file, to deliver an enclosed file. Independent producers, for example, can use podcasting to create self-published, syndicated "shows." Listeners may subscribe to feeds using aggregator software, which periodically checks for and downloads new content. Typical aggregators enable a user to copy podcasts to portable music players or other portable media players. A podcast is commonly viewed as including audio content, although the podcast concept may be viewed as encompassing audio and/or visual content transmission. "Enhanced" podcasts may further include images (e.g., JPG files) and HTML (hypertext markup language) links.

SUMMARY OF THE INVENTION

Some embodiments of the present invention provide methods of operating an electronic device, such as a wireless communications terminal, a personal digital assistant and/or a media player, having a personal information manager, such as a scheduling application and/or a contact management application. Data is received at the electronic device, the received data including audio and/or visual content and associated personal information manager data. The personal information manager is controlled responsive to the received personal information manager data.

In further embodiments, the data received at the electronic device includes a podcast including the audio and/or visual information and the associated personal information manager data. The associated personal information manager data may include event data, task data and/or contact data associated with the audio and/or visual content of the podcast. The personal information manager may be controlled responsive to playing the podcast. For example, a user may be queried for an authorization responsive to provision of the personal information manager data, and the personal information manager may be configured responsive to an authorization from the queried user.

Further embodiments of the present invention provide methods of providing audio and/or visual content to an electronic device. Personal information manager data for the electronic device is embedded in audio and/or visual content, such as in a podcast.

According to additional embodiments of the present invention, an electronic device includes a memory configured to store personal information manager data, a user interface and a processor, operatively coupled to the memory and the user interface and configured to provide a personal information manager that manages the personal information manager data in the memory. The processor is further configured to receive data, such as a podcast, including audio and/or visual content and associated personal information manager data, to present the audio and/or visual content via the user interface and to control the personal information manager responsive to the received personal information manager data. The personal information manager may include a scheduling application, a task management application, and/or a contact management application.

Further embodiments of the present invention provide a signal transmission medium having a signal embodied therein. The signal includes audio and/or visual content with embedded personal information manager data for an electronic device. The signal may include a podcast including the audio and/or visual information and the associated personal information manager data.

Additional embodiments of the present invention provide computer program products for operating an electronic device. A computer program product includes computer program code embodied in a storage medium, the computer program code including program code configured to provide a personal information manager, and program code configured to receive data including audio and/or visual content and associated personal information manager data and to control the personal information manager responsive to the received personal information manager data.

DETAILED DESCRIPTION OF EXEMPLARY EMBODIMENTS

Figure 1:
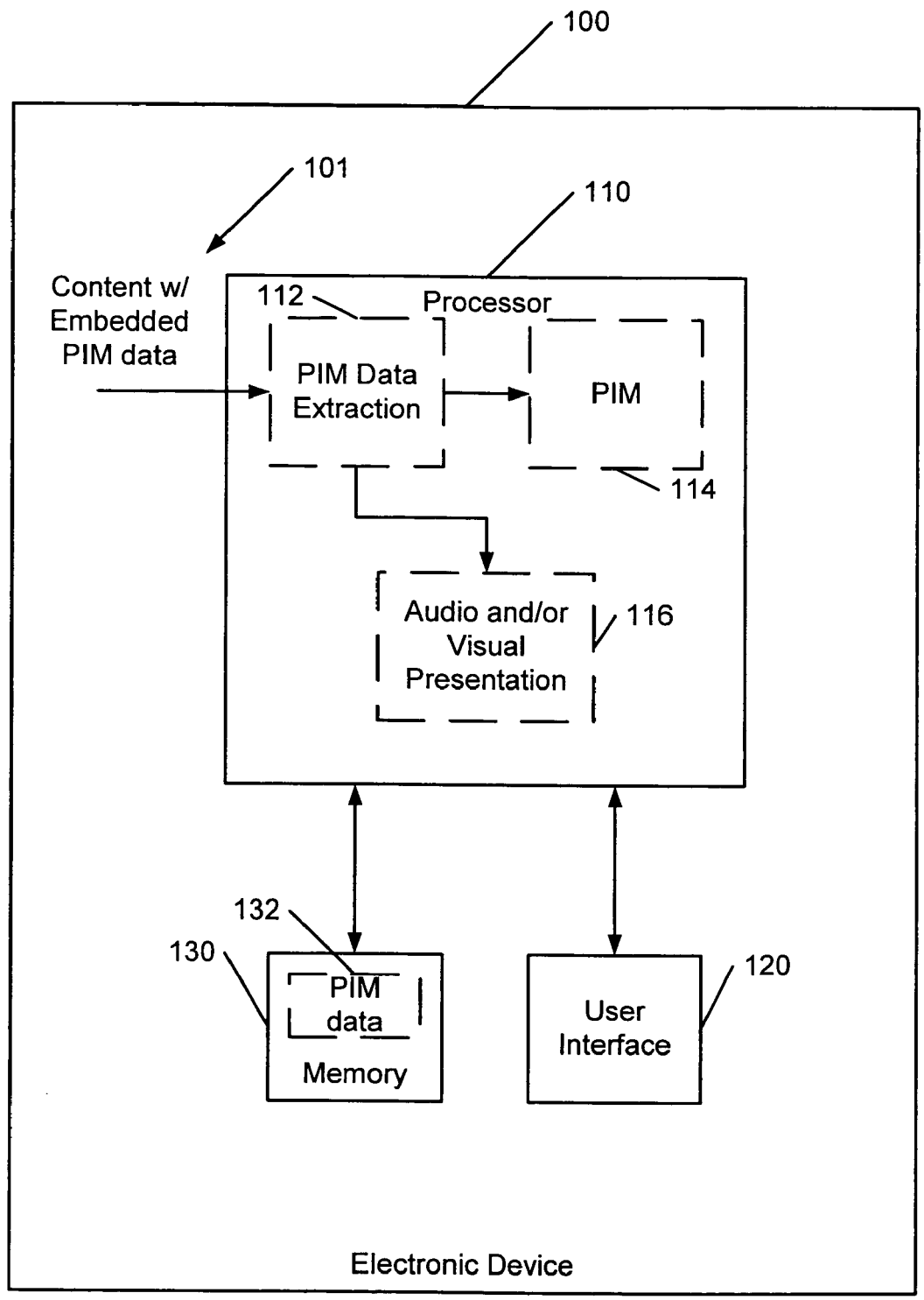
FIG. 1 is a schematic block diagram of an electronic device with personal information management capabilities according to some embodiments of the present invention.

Specific exemplary embodiments of the invention now will be described with reference to the accompanying drawings. This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular exemplary embodiments illustrated in the accompanying drawings is not intended to be limiting of the invention. In the drawings, like numbers refer to like elements.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As described herein, an electronic device may be configured to include a "personal information manager" (PIM). As used herein, a PIM is configured to provide management of personal information, such as information relating to dates, times, or contacts associated with a person, for example, a "user" of a device (which may correspond to more than one real person). Examples of PIMs include, but are not limited to, calendar applications, task management applications, and contact management applications (e.g., phone directories, e-mail directories, browsers with "bookmark" capabilities). The types of electronic devices that may be configured with one or more PIMs include, but are not limited to, personal computers (e.g., desktop, laptop and notebook), personal digital assistants (PDAs), mobile terminals (e.g., cellular telephones and cellular-capable PDAs), and media player devices (e.g., iPod® and other music players).

Embodiments of the present invention include methods, apparatus and computer program products wherein PIM data is embedded in and/or with audio and/or visual content, such as audio content in a podcast, that is provided to a electronic device, such as a personal computer, PDA or mobile terminal. "PIM data" as used herein refers to data that may be detected and used by the device to control operations of a PIM thereof. Such information may include explicit and implicit information for controlling a PIM. For example, the PIM data may be structured in an agreed-upon format (e.g., signaling standard) that includes, for example, fields that are assigned to certain PIM data, e.g., dates, times, telephone numbers and email addresses, as well as commands that initiate PIM functions, such as establishing appointments, scheduling tasks, creating phonebook entries and creating browser bookmarks. PIM data may also include implicit information that is detectable because of certain formats and/or content, such as dates, times or certain keywords, which may be detected and used for PIM control.

Embodiments of the present invention will now be described with reference to FIGS. 1-5. Referring to FIG. 1, a electronic device 100 includes a processor 110, which is operatively associated with a user interface 120 and a memory 130. The memory configured to store PIM data 132. The processor 110 is configured to receive data including audio and/or visual content and embedded associated PIM data 101. The processor 110 is further configured to present the audio and/or visual content via the user interface 120 and to automatically manage PIM data stored in the memory 130 responsive to the embedded PIM data.

In the illustrated embodiments, the processor 110, in conjunction with the memory 130, is configured to instantiate functional modules including a PIM data extraction module 112, a PIM module 114, and an audio and/or visual presentation module 116. The PIM data extraction module 112 may be configured to process the data 101 to extract the embedded PIM data. The PIM module 114 may be configured to supplement, delete, alter or otherwise modify PIM data in the memory 130 responsive to the extracted PIM data. The audio and/or visual presentation module 116 may be configured to process the audio and/or visual content to present to a user via the user interface 120. It will be appreciated that the arrangement of modules 112,114, 116 is provided for purposes of illustration, and that the functionality thereof may be provided by any of a variety of different processing architectures.

Figure 2:
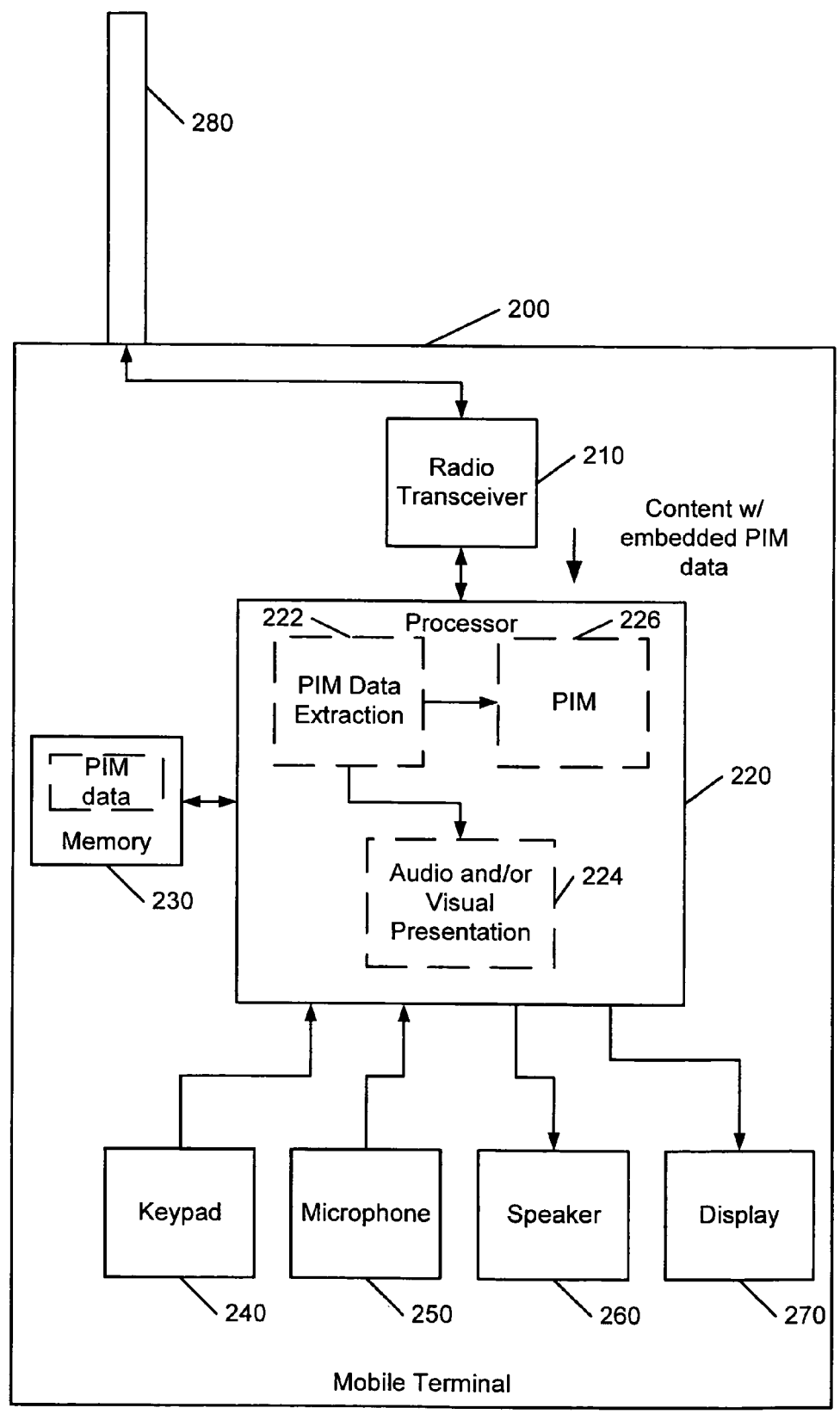
FIG. 2 is a schematic diagram illustrating a mobile terminal with personal information management capabilities according to further embodiments of the present invention.

As noted above, the present invention may be embodied in a variety of different electronic devices. For example, FIG. 2 illustrates a mobile terminal 200 with personal information management capabilities according to further embodiments of the present invention. The mobile terminal 200 includes a radio transceiver 210 that is configured to wirelessly communicate via an antenna 280. The radio transceiver 210 is operatively coupled to a processor 220. The processor 220 is also operatively coupled to a memory 230 and user interface components, including a keypad 240, a microphone 250, a speaker 260 and a display 270. The processor 220 and the memory 240 may be configured to support various telecommunications and other functions in conjunction with various ones of the radio transceiver 210 and the user interface components.

In the embodiments illustrated in FIG. 2, the processor 220, in conjunction with the memory 230, is configured to instantiate functional modules, including a PIM data extraction module 222, a PIM module 226, and an audio and/or visual presentation module 224. The PIIM data extraction module 222 may be configured to process data received, for example, via the radio transceiver 210, to extract embedded PIM data. It will be appreciated that such data may come from sources other than a radio transmission, such as from a wireline connection (e.g., a USB connection to a computer) or storage media (e.g., flash memory or disk) resident (but not shown in FIG. 2) at the mobile terminal. The PIM module 226 may be configured to supplement, delete, alter or otherwise modify PIM data 232 in the memory 230 responsive to the extracted PIM data. The audio and/or visual presentation module 224 may be configured to process the audio and/or visual content to present to a user via the speaker 260 and/or display 270. It will be appreciated that the arrangement of the modules 222, 224, 226 is provided for purposes of illustration, and that the functionality thereof may be provided by any of a variety of different processing architectures.

Content-related control of a PIM of a electronic device, such as a mobile terminal, may occur in a variety of different ways within the scope of the present invention. Examples of PIM control responsive to embedded data in podcasts will now be described with reference to FIGS. 3-5. It will be appreciated that the description is provided for purposes of illustration, and that variations on the operations described fall within scope of the present invention. For example, the invention may be used with audio and/or visual content formats other than podcasts, and may occur in different sequences than the operations described below. It will be further understood that the sequence in which audio/visual content and PIM data is accessed and/or acted upon may vary. For example, execution of PIM control function generally may vary based upon such factors as the manner in which the PIM data is embedded (e.g., distributed within the audio and/or visual content or at a dedicated position in a header of trailer for the content) and the type of PIM data (e.g., event information may be handled differently than contact information).

Figure 3:
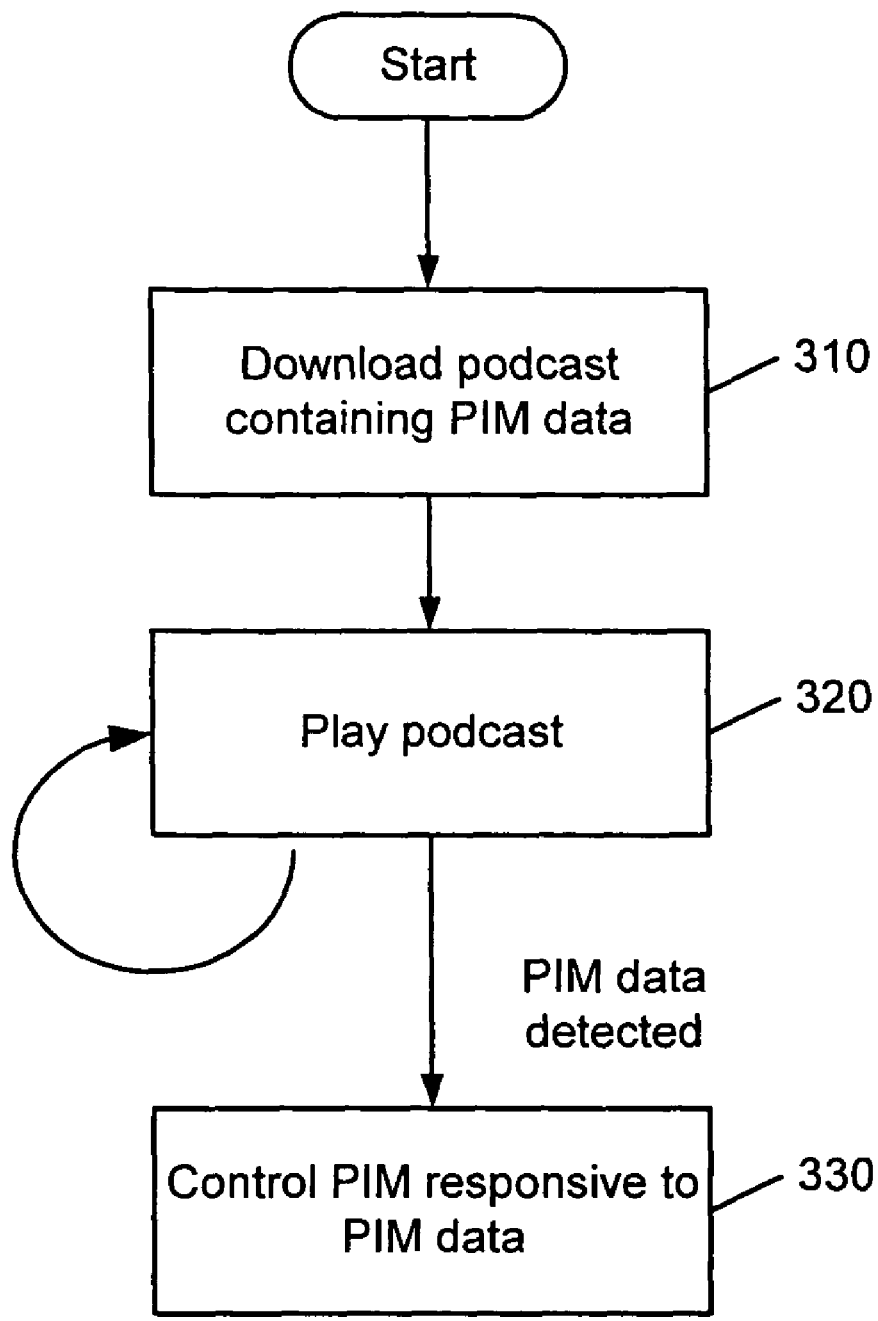
FIGS. 3-5 are flowcharts illustrating operations for managing personal information in an electronic device responsive to embedded PIM data in audio and/or visual content according to various embodiments of the present invention.

FIG. 3 illustrates operations for controlling an electronic device responsive to embedded PIM data in a podcast according to some embodiments of the present invention. A podcast that includes audio and/or visual content and embedded PIM data is downloaded, for example, via a wireless and/or wireline internet connection or from a storage medium (block 310). Some time after the download, the podcast is played (block 320). During playback of the podcast, embedded PIM data may be detected, and a PIM of the device may be controlled based on the detected PIM data. (block 330). PIM functions, e.g., creation of appointments, reminders, tasks, contact entries, bookmarks or the like, may occur concurrent with playback of the podcast.

Figure 4:
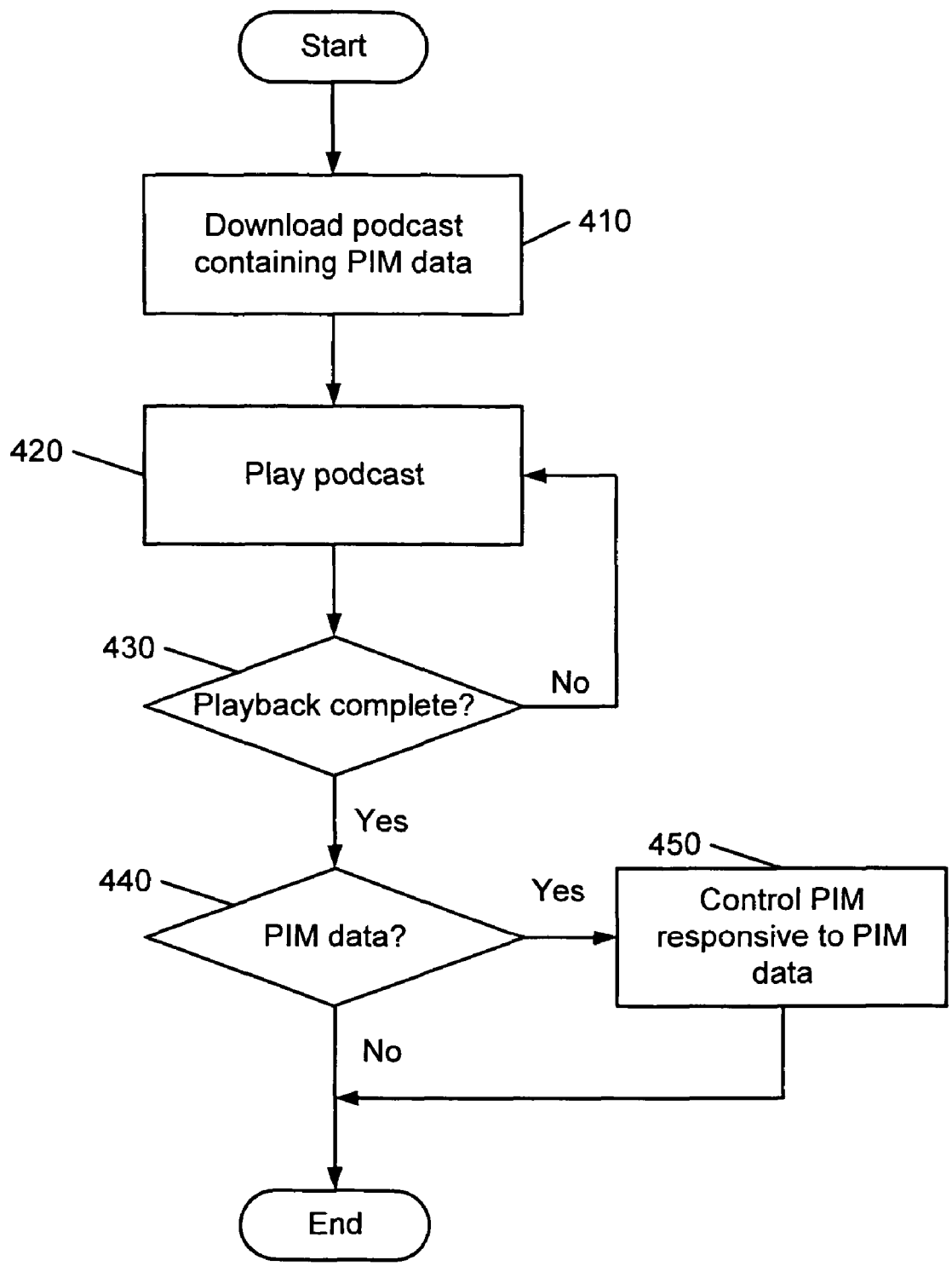

Referring to FIG. 4, PIM data embedded in a podcast may also be processed separately from playback of the podcast. A podcast including embedded PIM data is downloaded to a electronic device (block 410). The podcast is played (420). At conclusion of the playback (block 430), the device determines whether PIM data associated with the podcast needs to be processed (block 440). If so, a PIM of the device is controlled responsive to the PIM data (block 450). It will be appreciated that the determination of whether to process PIM data (block 440) may include a determination of whether any PIM data is present and/or, if PIM data is present, whether the PIM data meets certain predetermined criteria. For example, a user could pre-establish criteria as to what types of PIM data may be allowed to affect the device's PIM, and the device may ignore PIM data that fails to meet these criteria.

It will be appreciated that the examples shown in FIGS. 3 and 4 are provided for purpose of illustration, and that PIM data may be processed in a number of other ways within the scope of the present invention. For example, instead of extracting PIM content during or after play of a podcast, embedded PINM data could be extracted, for example, currently with downloading of content with embedded PIM data.

Figure 5:
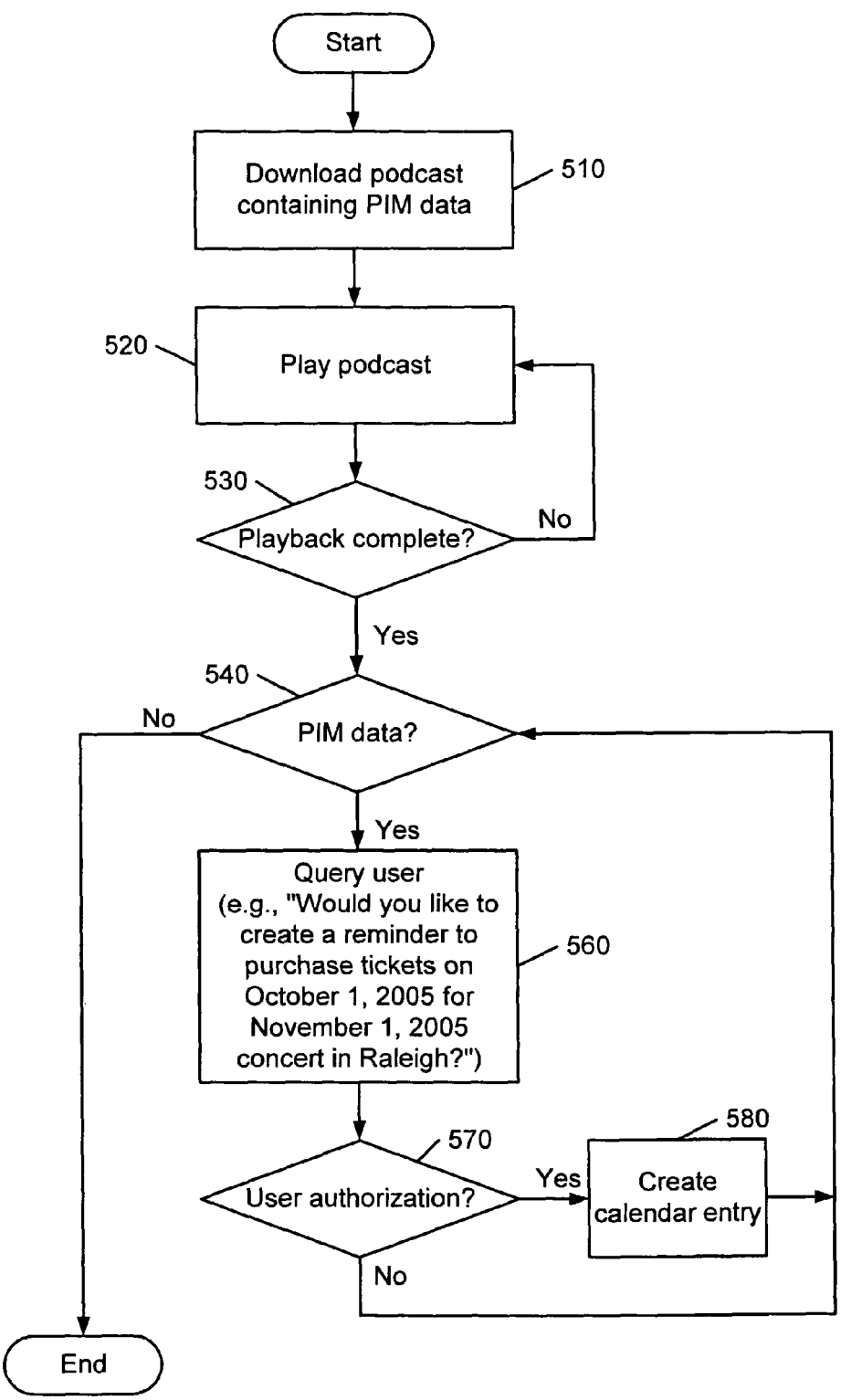

PIM control may also include user interaction upon detection of PIM data in a content stream. In embodiments of the present invention shown in FIG. 5, a podcast including an audio recording of a musical performance with embedded PIM data relating to the performer, such as dates for upcoming appearances, ticket sales and the like, is downloaded to an electronic device (block 510). The podcast is played (block 520) and, responsive to the termination of playback (block 530), the device determines whether PIM data needs to be processed (block 540). If PIM data is to be processed, the device may then query the user for authorization to effect a change of personal information managed by the device's PIM (block 560). For example, as shown in FIG. 5, the device may ask the user to indicate whether she desires to create a calendar entry for a date at which tickets for a local performance go on sale. Upon receipt of authorization for the entry (block 570), the device creates the desired calendar entry (block 580). If no authorization is provided, the device foregoes creation of the entry.

The device may then determine whether further PIM data is present (block 540). For example, the device may detect PIM data relating to other performance dates that could be entered into the user's calendar, contact information for the performer, such as an email address, which may be entered into the user's contact manager, or a website bookmark for the user's browser. If no further PIM data remains to be processed, operations may terminate.

Figure 6A:
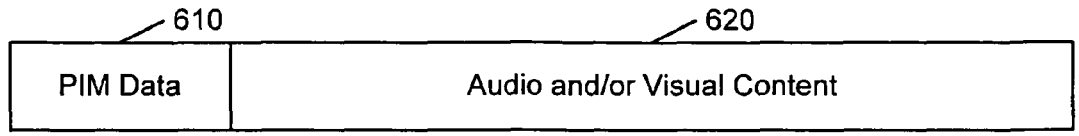
FIGS. 6A-6C illustrate signal formats according to some embodiments of the present invention.
Figure 6B:
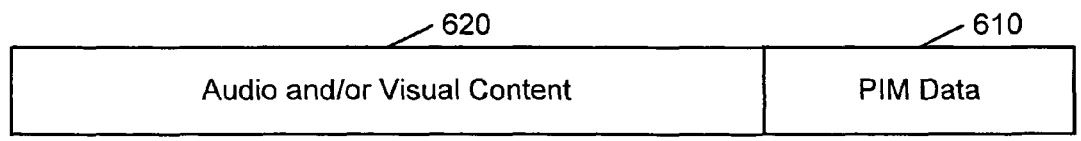
Figure 6C:
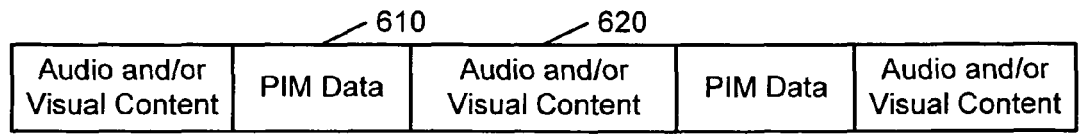

FIGS. 6A-6C illustrate examples of signal formats that may be used for audio and/or visual content with embedded PIM data. As shown in FIGS. 6A and 6B, PIM data 610 may be included, for example, in a header and/or trailer preceding or following, respectively, audio and/or visual content 620. In other embodiments, as shown in FIG. 6C, PIM data 610 may, for example, be interspersed with audio and/or visual content 620. It will be appreciated that other formats may be used with the invention and that, generally, the arrangement of data may be determined by industry specification (e.g., standards) and/or or the nature of the PIM data and/or the audio and/or visual content.

As will be appreciated by one of skill in the art, the present invention may be embodied as methods, systems, computer program products, and signal transmission media. Accordingly, the present invention may be embodied in hardware, software or combinations thereof. Furthermore, the present invention may take the form of a computer program product on a computer-usable storage medium having computer-usable program code embodied in the medium or as a signal embodied in a signal transmission medium. Applicable signal transmission media include, but are not limited to, wireline, wireless or optical transmission links as may be provided in a computer or telecommunications network. Applicable storage media include, but are not limited to, hard disks, CD-ROMs, optical storage devices and magnetic storage devices.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language and/or a lower level assembler language. The program code may execute entirely on the user's computer (i.e., controller of the user's mobile terminal), partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Furthermore, the present invention was described in part above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and schematic diagrams of herein illustrate the architecture, functionality, and operations of some embodiments of the present invention. In this regard, each block may represent a module, segment, or portion of code, which comprises one or more executable instructions for implementing the specified logical function(s). It should also be noted that in other implementations, the function(s) noted in the blocks may occur out of the order noted in the figures. For example, two blocks shown in succession may, in fact, be executed substantially concurrently or the blocks may sometimes be executed in the reverse order, depending on the functionality involved.

In the drawings and specification, there have been disclosed exemplary embodiments of the invention. Although specific terms are employed, they are used in a generic and descriptive sense only and not for purposes of limitation, the scope of the invention being defined by the following claims.

That which is claimed is:

1. A method of operating an electronic device having a personal information manager configured to provide management of schedule and/or contact data for a user of the electronic device, the method comprising:
    receiving a podcast at the electronic device, the received podcast including audio and/or visual content and associated personal information manager data; and
    controlling the personal information manager responsive to the received personal information manager data to manage schedule and/or contact data for the user of the electronic device.

2. The method of claim 1, wherein the personal information manager data comprises event data, task data and/or contact data associated with the audio and/or visual content.

3. The method of claim 1, wherein controlling the personal information manager responsive to the received personal information manager data comprises controlling the personal information manager responsive to playing the podcast.

4. The method of claim 1, wherein controlling the personal information manager responsive to the received personal information manager data comprises:
    querying a user for an authorization responsive to provision of the personal information manager data; and
    modifying personal information manager data responsive to an authorization from the queried user.

5. The method of claim 1, wherein controlling the personal information manager responsive to the received personal information manager data comprises controlling the personal information manager responsive to presentation of the audio and/or visual content to a user of the electronic device.

6. The method according to claim 1, wherein the electronic device comprises a wireless communications terminal, a personal digital assistant and/or a media player.

7. A method of providing audio and/or visual content to an electronic device, the method comprising:
    embedding personal information manager data for the electronic device in a podcast including audio and/or visual content, the personal information manager data configured to cause a personal information manager in the electronic device to manage schedule and/or contact data for the user of the electronic device in response to receipt of the podcast.

8. The method of claim 7, wherein the personal information manager data comprises event data, task data and/or contact data associated with the audio and/or visual content.

9. The method according to claim 7, wherein the electronic device comprises a wireless communications terminal, a personal digital assistant and/or a media player.

10. An electronic device comprising:
    a memory configured to store personal information manager data;
    a user interface; and
    a processor configured to provide a personal information manager that manages the personal information manager data in the memory, the processor further configured to receive a podcast including audio and/or visual content and associated personal information manager data, to present the audio and/or visual content via the user interface and to control the personal information manager responsive to the received personal information manager data to manage schedule and/or contact data for a user of the electronic device.

11. The device of claim 10, wherein the associated personal information manager data comprises event data, task data and/or contact data associated with the audio and/or visual content.

12. The device of claim 10, wherein the processor is configured to control the personal information manager responsive to playing the podcast.

13. The device of claim 10, wherein the processor is configured to query a user for an authorization responsive to receipt of the personal information manager data and to control the personal information manager responsive to receipt of an authorization from the queried user.

14. The device of claim 10, wherein the processor is configured to control the personal information manager responsive to presentation of the audio and/or visual content via the user interface.

15. The device of claim 10, further comprising means for providing the received data to the processor from a communications medium.

16. A computer program product for operating an electronic device, the computer program product comprising computer program code embodied in a storage medium, the computer program code comprising:
    program code configured to provide a personal information manager; and
    program code configured to receive a podcast including audio and/or visual content and associated personal information manager data and to control the personal information manager responsive to the received personal information manager data to manage schedule and/or contact data for a user of the electronic device.

17. The computer program product of claim 16, wherein the associated personal information manager data comprises event data, task data and/or contact data associated with the audio and/or visual content.

* * * * *